(12) United States Patent
Park et al.

(10) Patent No.: US 9,137,583 B2
(45) Date of Patent: Sep. 15, 2015

(54) METHOD FOR SECURING INDIRECT RETURN CHANNEL AND MOBILE DIGITAL BROADCAST RECEIVER THEREOF

(75) Inventors: Sang Il Park, Seoul (KR); O Bong Kwon, Seoul (KR)

(73) Assignee: CREST TECHNOLOGY, INC., Seoul (KR)

( * ) Notice: Subject to any disclaimer, the term of this patent is extended or adjusted under 35 U.S.C. 154(b) by 632 days.

(21) Appl. No.: 13/483,814

(22) Filed: May 30, 2012

(65) Prior Publication Data

US 2013/0322496 A1 Dec. 5, 2013

(51) Int. Cl.
*H04B 1/38* (2015.01)
*H04N 21/61* (2011.01)
*H04N 21/4782* (2011.01)
*H04N 21/236* (2011.01)
*H04N 21/235* (2011.01)
*H04N 21/435* (2011.01)
*H04N 7/173* (2011.01)
*H04N 21/6334* (2011.01)

(52) U.S. Cl.
CPC ....... *H04N 21/6175* (2013.01); *H04N 7/17309* (2013.01); *H04N 21/235* (2013.01); *H04N 21/23614* (2013.01); *H04N 21/435* (2013.01); *H04N 21/4782* (2013.01); *H04N 21/6187* (2013.01); *H04N 21/6334* (2013.01)

(58) Field of Classification Search
CPC .............. H04L 69/168; H04L 12/2803; H04L 12/2834; H04L 12/4625; H04L 12/5601; H04L 69/161; H04L 2012/5638; H04N 21/6334; H04N 21/6175
USPC ................... 370/217, 219, 392; 709/203, 235
See application file for complete search history.

(56) References Cited

U.S. PATENT DOCUMENTS

| | | | | |
|---|---|---|---|---|
| 6,163,537 A | * | 12/2000 | Thacker | 370/352 |
| 2008/0279119 A1 | * | 11/2008 | Stille et al. | 370/261 |
| 2013/0103833 A1 | * | 4/2013 | Ringland et al. | 709/224 |

* cited by examiner

*Primary Examiner* — Jae Y Lee
*Assistant Examiner* — Jean F Voltaire
(74) *Attorney, Agent, or Firm* — Lowe Hauptman & Ham, LLP (57) ABSTRACT

The present invention relates to a method for securing indirect return channel and mobile digital broadcast receiver, and more particularly, to a method for securing the indirect return channel for mobile digital broadcast receiver without internal Internet access capabilities by enabling indirect access to Internet using external Internet devices having internal Internet access capabilities, and a mobile digital broadcast receiver securing indirect return channel using external Internet devices with internal Internet access capabilities.

28 Claims, 4 Drawing Sheets

Fig. 1

PRIOR ART

METHOD FOR SECURING INDIRECT RETURN CHANNEL AND MOBILE DIGITAL BROADCAST RECEIVER THEREOF

FIELD OF THE INVENTION

The present invention relates to a method for securing indirect return channel and mobile digital broadcast receiver thereof, and more particularly, to a method for securing indirect return channel for mobile digital broadcast receiver without Internet access capabilities by enabling indirect access to Internet using external communications devices with Internet access capabilities and a mobile digital broadcast receiver for securing indirect return channel via the external communications devices with Internet access capabilities.

BACKGROUND OF THE INVENTION

In general, digital broadcasting services provide multi-channel and multimedia broadcasting with higher quality of service in terms of video and audio quality than analog broadcasting services. Further, digital broadcasting services also provide multifunctional and interactive broadcasting where multimedia contents are provided by the broadcasting channel with more efficient bandwidth usage. For interactive broadcasting services, it is required to enable data transmission between broadcast receiver and remote data server using data return channel.

In digital broadcasting services, a CAS (Conditional Access System) for enabling conditional access and regional restriction may be established through data transmission using return channel between broadcast receiver and remote CAS data server. Under CAS system, broadcasting services may be available by periodically transmitting and receiving CAS-related "key" through data transmission between CAS server and broadcast receiver.

A CAS system, together with a subscriber management system, is an essential system for providing subscription-based broadcasting services. In contrast to terrestrial broadcasting system for providing TV program to unspecified people, a CAS system allocates individual or group address to each subscriber to provide subscriber-specific TV program or other services with more accuracy and convenience. Various additional services including pay-per-view (PPV) and near-video-on-demand (NVOD) may be provided through the usage of CAS system.

Figure 1:
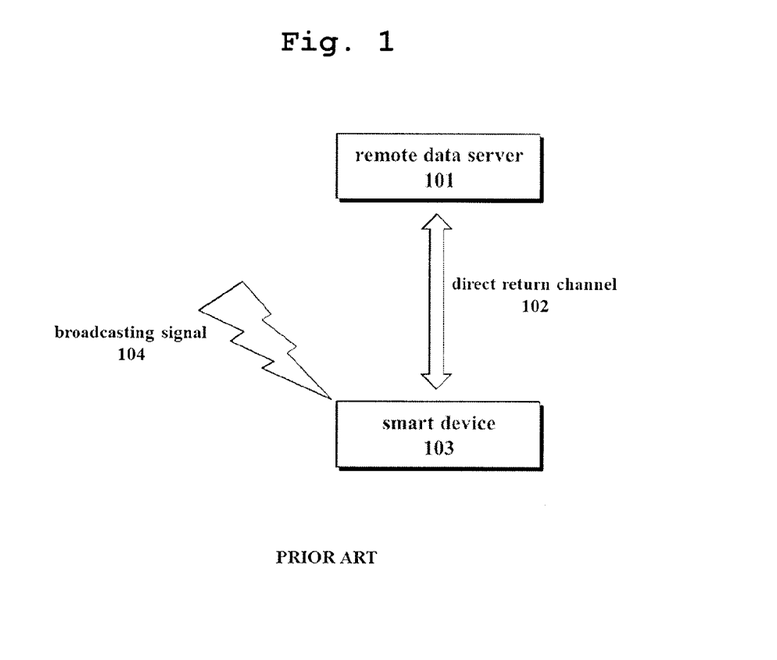
FIG. 1 illustrates block diagram of an exemplary conventional mobile digital broadcasting system.

FIG. 1 illustrates a conventional CAS system for digital mobile TV (DMTV) broadcasting.

The smart device 103 such as smart phone, smart pad and tablet PC may receive broadcasting signal 104 and generate direct return channel 102 for transmitting and receiving data to and from a remote data server 101 using internal Internet access capabilities. User profile information such as subscriber administration data and subscriber's propensity for TV program may be collected in the remote data server 101 via the direct return channel 102 generated by the smart device 103.

Since collection of user profile information is essential to MDTV broadcasting business in commercial sense it is required to secure a data return channel from a mobile digital broadcast receiver to the remote data server. Currently, MDTV broadcasting service providers use Internet channel using WiFi or 3G data communications as data return channel, and thus the smart devices 103 having internal WiFi and 3G data communications capabilities haven been selected as optimal receivers for MDTV broadcasting services.

However, other types of mobile digital broadcast receivers without internal Internet capabilities such as portable DVD player, portable navigation device (PND), car AV box, portable game terminal and other type of multimedia display devices may not be used as the mobile digital broadcasting receiver since they are not supported with WiFi or 3G data communications for Internet connection.

It is needed to employ internal or external Internet access capabilities to the existing mobile digital broadcast receiver without internal Internet access capabilities to provide mobile digital broadcasting service with CAS, which incurs additional manufacturing cost to device manufacturers for internal module and additional expenses to users for external module. The cost increase has been a non-negligible business obstacle in providing digital mobile broadcasting services with CAS to both industry and users.

SUMMARY OF THE INVENTION

In view of the above, according to an aspect of the present invention there is provided a method for securing indirect return channel for a mobile digital broadcast receiver comprising the steps of: searching for external Internet devices with internal Internet access capabilities; generating an inter-device network connection by transmitting signals of a request for inter-device network connection to one of the detected external Internet devices; securing the indirect return channel between the mobile digital broadcast receiver and a remote server via the requested external Internet device; and transmitting and receiving data used in digital broadcasting services to and from the remote data server using the indirect return channel.

The step of transmitting and receiving data may comprise the step of periodically receiving CAS data from the remote data server using the indirect return channel, the remote data server being a CAS data server.

The step of transmitting and receiving data may comprise the step of periodically transmitting user profile information to the remote data server using the indirect return channel.

The step of searching for external Internet devices may comprise the step of searching for the external Internet devices upon receiving update request for CAS information.

The step of searching for external Internet devices may comprise the step of searching for the external Internet devices within a predetermined distance from the mobile digital broadcast receiver using a local area transceiver module.

The local area transceiver module may include WiFi, Bluetooth, NFC, RFID and USB module.

The external Internet devices may include any type of external Internet devices connectable to Internet via 3G or WiFi data communications.

The communications technology for establishing the inter-device network connection includes WiFi, Bluetooth, NFC, RFID and USB.

The step of generating the inter-device network connection may further comprise the steps of: displaying the detected external Internet devices; and receiving instructions for generating inter-device network connection to one of the detected external Internet devices.

The step of generating the inter-device network connection may further comprise the steps of: displaying a selection menu when a multiple number of external Internet devices are found to be available for inter-device network connection; and receiving instructions for generating inter-device network connection to the selected external Internet devices.

The step of generating the inter-device network connection may comprise the step of: generating the inter-device network connection based on log data when a multiple number of external Internet devices are found to be available for inter-device network connection.

The step of generating the inter-device network connection may comprise the step of: generating the inter-device network connection based on the log data with the external Internet device with which the most recent inter-device network connection has been established.

The step of generating the inter-device network connection may comprise the step of: generating the inter-device network connection based on the log data with the external Internet device having the best inter-device network communications quality.

The step of generating the inter-device network connection may comprise the step of: generating the inter-device network connection based on the log data with the external Internet device having the best communications quality in the indirect return channel.

The method further comprises the step of performing user profile registration, modification and cancellation through the indirect return data channel.

The method further comprises the step of providing additional services in VOD, e-commerce and game through the indirect return data channel.

The indirect return channel may be selected from a group consisting of digital CATV (Cable Television) channel, DECT (Digital Enhanced Cordless Telecommunications) channel, PSTN (Public Switched Telephone Network) channel, ISDN (Integrated Services Digital Network) channel, LMDS (Local Multipoint Distribution System) channel, ATSC-M/H (Advanced Television Standards Committee Mobile/Handheld) return channel, ISDB-T (Integrated Services Digital Broadcasting-Terrestrial) return channel, and MATV (Master-Antenna Television) channel.

According to another aspect of the present invention, there is provided a mobile digital broadcast receiver comprising: a broadcast receiver module for receiving digital broadcasting signals; a display module for displaying broadcast contents in accordance with the received broadcasting signals; a transceiver module for searching external Internet devices with internal Internet access capabilities and transmitting signals of a request for inter-device network connection to one of the detected external Internet devices to generate an inter-device network connection; and a controller module for securing an indirect return channel to a remote data server via the external Internet device using the generated inter-device network connection and controlling the transceiver module to transmit and receive data used in broadcasting services to and from the remote data server.

In the mobile digital broadcast receiver, the controller module controls the transceiver module to periodically receive CAS data from the remote data server and controls the broadcast receiver module to decode the received digital broadcast signals using the received CAS data.

The mobile digital broadcast receiver may further comprise a storage module and periodically transmit user profile information stored in the storage module to the remote data server using the secured indirect return channel.

In the mobile digital broadcast receiver, the transceiver module may search the external Internet device in response to an update request for CAS information.

In the mobile digital broadcast receiver, the transceiver module may use at least one communications technology including WiFi, Bluetooth, NFC, RFID and USB.

In the mobile digital broadcast receiver, the external Internet device is connectable to Internet via 3G or WiFi data communications.

In the mobile digital broadcast receiver, the controller module may control the display module to display at least one of the detected external Internet devices and receive instructions for generating an inter-device network connection, and generate the inter-device network connection by transmitting signals of a request for inter-device network connection to the at least one of the detected external Internet devices.

In the mobile digital broadcast receiver, the controller module may control the display module to display a selection menu for selecting one of the detected external Internet devices when a multiple number of the external Internet devices are detected, and generate the inter-device network connection by transmitting signals of a request for inter-device network connection to the selected external device when selecting input is received.

The mobile digital broadcast receiver may further comprise a storage module storing log data regarding inter-device network connection, and the controller module may generate the inter-device network connection by transmitting signals of a request for inter-device network connection to one of the detected external devices based on the log data when a multiple number of external Internet devices are detected.

In the mobile digital broadcast receiver, the controller module may generate the inter-device network connection based on the log data with the external Internet device with which the most recent inter-device network connection has been established.

In the mobile digital broadcast receiver, the controller module may generate the inter-device network connection based on the log data with the external Internet device having the best inter-device network communications quality.

The mobile digital broadcast receiver may further comprise a storage module for storing log data regarding the indirect return channel, and the controller module may generate the inter-device network based on the log data with the external Internet device having the best communications quality in the indirect return channel.

In conventional technologies for mobile digital broadcasting services where data transmission is required for CAS data and user profile data, a mobile digital broadcast receiver having internal Internet access capabilities has been needed for generating return channel for collecting the CAS and user profile data.

However, according to the present invention, even a mobile digital broadcast receiver without internal Internet access capabilities may indirectly access Internet and generate indirect return channel using external Internet devices.

Using the methodologies for securing indirect return channel according to the present invention, the scope of devices available for mobile digital broadcast service with CAS may extend to all kinds of mobile digital broadcast receivers even without internal Internet access capabilities and even more efficient and extensive collection of user profile has been available to the providers of the digital broadcasting services. In addition, the indirect return channel according to the present invention may be used to provide additional value-added services in VOD, web-browsing, e-commerce, game, and so forth. Importantly, these benefits are acquired with no or only negligible increase in the cost burden to both industry and users.

BRIEF DESCRIPTION OF THE DRAWINGS

The above features of the present invention will become apparent from the following description of embodiments, given in conjunction with the accompanying drawings, in which.

- 101: remote data server
- 102: direct return channel
- 103: smart device
- 104: broadcasting signal
- 201: remote data server
- 202: indirect return channel
- 203: smart device
- 204: broadcasting signal
- 205: mobile digital broadcast receiver
- 206: inter-device network connection
- S301: Searching smart devices with Internet access capabilities
- S302: Generating inter-device network connection
- S303: Securing return channel
- S304: Transmitting and receiving broadcasting data
- S321: Displaying search results
- S322: Receiving user input
- S323: Transmitting signals of request for inter-device network connection
- S324: Generating inter-devices network connection
- 401: user interface
- 402: search result window
- 403: detected smart device
- 404: confirm button
- 501: user interface
- 502: search result window
- 503: detected external Internet devices
- 504: re-search button
- 600: mobile digital broadcast receiver
- 601: broadcast receiver module
- 602: display module
- 603: controller module
- 604: transceiver module
- 605: storage module

DETAILED DESCRIPTION OF THE EMBODIMENTS

The advantages and features of the present invention and methods of accomplishing these will be clearly understood from the following embodiments taken in conjunction with the accompanying drawings. However, the present invention is not limited to those embodiments but may be implemented in various forms. It should be noted that the present embodiments are provided to make a full disclosure of the invention and also to allow those skilled in the art to know the full range of the invention. Therefore, the present invention is to be defined only by the scope of the appended claims. Further, like reference numerals identify like or similar elements throughout the specification.

In this specification, the detailed explanations regarding the functions and structures of known elements may be omitted. Since the definition and wordings of the elements may vary depending on the users, system operators or conventional rules they shall be interpreted considering the whole contents of the specification.

Each block of block diagram, each step of flow chart and their combinations in the accompanied drawings may be implemented by instructions of computer program.

These computer program instructions may be installed in the processor of a general purpose computer, special purpose computer or any other programmable data processing apparatus such as mobile digital broadcast receiver, smart device or external Internet device. Thus these instructions executed by the processor of the computer or any other programmable data processing apparatus generate means for performing the functions explained in each block or step of the drawings.

These computer program instructions may be stored in the computer-usable or computer-readable memories adapted to a computer or any other programmable data processing apparatus. Thus one could manufacture a product containing the instruction means for executing the functions explained in each block or step of the drawings.

Further, since computer program instructions may be installed in the computer or any other programmable data processing apparatus, a series of operating steps can be performed by the computer or the apparatus to generate a computer-executable process to execute the functions explained in each block or step of the drawings.

Still further, the each block or step may be implemented as module, segment or a part of codes employing at least one instruction for performing a specified logical function(s).

Attentions shall be drawn to several alternative embodiments where the functions are performed in a different order from what is stated in the blocks or steps of the drawings. For example, the two consecutive blocks or steps may be substantially simultaneously implemented or they could be executed in a reverse order according the functions designated by those blocks or steps.

Hereinafter, embodiments of the present invention will be explained in more detail with reference to the accompanying drawings.

Figure 2:
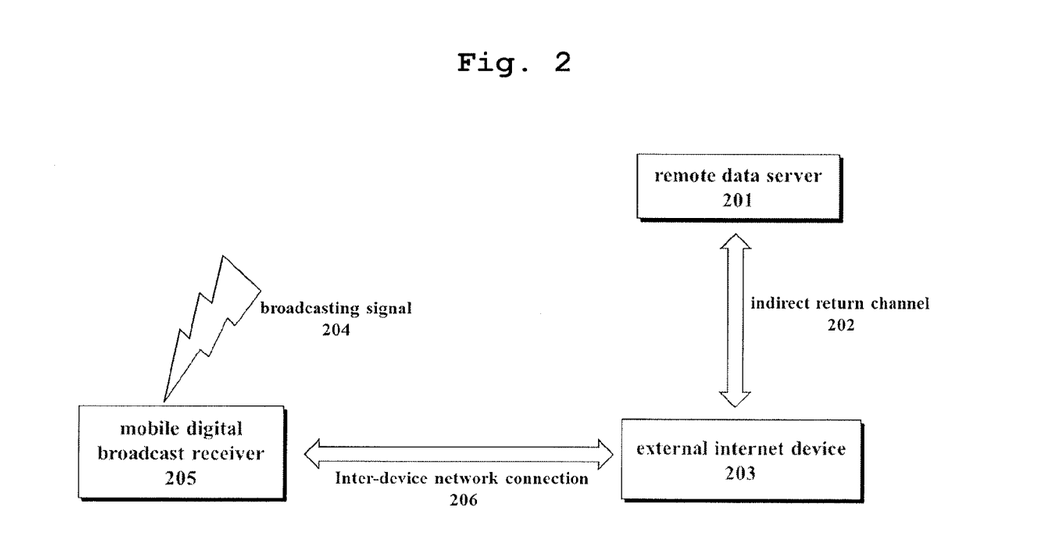
FIG. 2 illustrates block diagram of a mobile digital broadcasting system according to an embodiment of the present invention.

FIG. 2 illustrates a block diagram of a mobile digital broadcasting system according to an embodiment of the present invention.

The mobile digital broadcast receiver 205 includes a broadcast receiver module and transceiver module. The broadcast receiver module receives broadcasting signal 204 to display TV program or other service contents on a display panel of the mobile digital broadcast receiver 205. The transceiver module enables inter-device direct communications between the mobile digital broadcast receiver 205 and external Internet device(s) 203 with internal Internet access capabilities. The mobile digital broadcast receiver 205 may include, but not limited to, portable DVD player, personal navigation device (PND), car AV box, portable game terminal, car navigation terminal, seat-embedded display in cars, aviators and trains, notebook computers, portable tablet PCs and other types of display devices without internal Internet access capabilities. The mobile digital broadcast receiver 205, which may be interpreted as mobile digital TV (MDTV) within the scope of the present invention, may include various types of portable display devices that are capable of receiving digital TV broadcasting signals and establishing inter-device network connection 206 with external Internet device(s) 203 having internal Internet access capabilities.

While the mobile digital broadcast receiver 205 does not have internal Internet access capabilities, it may be directly interconnected with the external Internet device 203, generate an indirect return channel 202 to a remote data server 201 via the external Internet device 203 and secure the indirect return channel 202 required for mobile digital broadcasting service with CAS.

The external Internet device 203 may include, but not limited to, smart phone, smart pad, tablet PCs, smart tablet, mobile phone, open WiFi AP (access point) and other types of portable communications devices having Internet access capabilities capable of data communications with the remote server 201 through available mobile communications technologies such as 3G, 4G, LTE, WiFi, etc. Other types of communications technologies having Internet access capabilities such as satellite communications, Public Switched Telecommunications Network (PSTN) and Wibro may also be employed in securing indirect return channel 202 according to the present invention.

The inter-device direct data communications between the mobile digital broadcast receiver 205 and the external Internet device 203 may adopt various kinds of available communications technologies including, but not limited to, WiFi, Bluetooth, NFC, RFID, Zigbee, USB, Serial communications, etc.

Using the above-described configuration of the mobile digital broadcasting system, mobile digital broadcasting services with CAS or other interactive data communications may be enabled using any mobile digital broadcast receivers even without internal Internet access capabilities.

Figure 3:
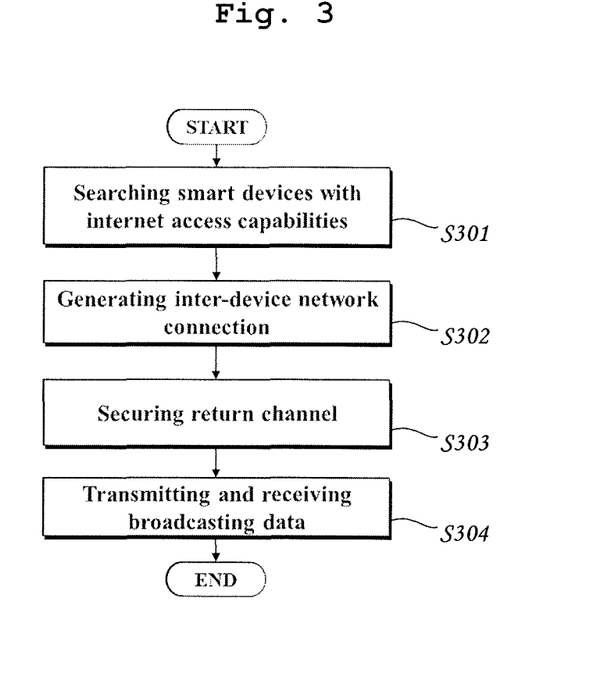
FIG. 3 illustrates a flow chart for securing indirect return channel according to an embodiment of the present invention.

FIG. 3 shows a flow chart of a method for securing an indirect return channel 202 according to an embodiment of the present invention.

In step 301, the mobile digital broadcast receiver 205 begins to search external Internet device 203 with internal Internet access capabilities. For example, the mobile digital broadcast receiver 205 may search an external Internet device 203 with internal Internet access capabilities located within a predetermined or accessible distance from the mobile digital broadcast receiver 205 using a wireless local area network (WLAN) such as WiFi, Bluetooth, NFC or RFID.

The mobile digital broadcast receiver 205 may pre-store profile information of the external Internet device 203 based on prior search results and begin to search the external Internet devices 203 corresponding to the pre-stored profile information.

Further, during TV broadcasting services, the mobile digital broadcast receiver 205 may begin to search nearby external Internet device 203 in response to a request for update of CAS information.

The mobile digital broadcast receiver 205 may display a message using its display module to provide operation information regarding currently on-going search to the user. It may also display a message asking the user to move to different location or to relocate the available external Internet devices 203 to a nearby or accessible location.

However, the direct communications or inter-device connection between the mobile digital broadcast receiver 205 and the external Internet device 203 may be implemented via a manual connection by the user using USB connection and, in this case, the search step 301 may be omitted.

Next, in step 302, in completion with the search for external Internet device(s) 203 with internal Internet access capabilities, an inter-device direct network communications between the mobile digital broadcast receiver 205 and the external Internet device 203 is to be established. The inter-device connection between the two devices 203, 205 may be established through transmission of signals for requesting inter-device connection. The inter-device network connection between the two devices 203, 205 may be generated by a wireless local area network (WLAN) such as WiFi, Bluetooth, NFC and RFID or a direct USB connection.

In a particular embodiment, the mobile digital broadcast receiver 205 may select an external Internet device 203 with internal Internet access capabilities using pre-stored log data and transmit a signal of request for inter-connection according to the log data.

The log data pre-stored in the mobile digital broadcast receiver 205 may include information regarding inter-device connection history, network quality of return channel, network quality of inter-device connection, the number of times being networked, frequency of network connection, etc. between the mobile digital broadcast receiver 205 and one or more external Internet devices 203. The log data may also include information of return channel between the external Internet device 203 and the remote data server 201 regarding networking history, network communications quality, the number of times being networked, frequency of network connection, etc.

For example, based on the log data, the mobile digital broadcast receiver 205 may establish an inter-device network connection by transmitting a signal of request for interconnection to an external Internet device 203 with which the most recent inter-device network connection 206 has been established.

For another example, based on the log data, the mobile digital broadcast receiver 205 may establish an inter-device network connection 206 by transmitting a signal of request for interconnection to an external Internet device 203 with the best network communications quality in inter-device network connection 206.

For a further example, based on the log data, the mobile digital broadcast receiver 205 may establish an inter-device network connection 206 by transmitting a signal of request for interconnection to an external Internet device 203 which has established the most recent indirect return channel 202 with the remote data server 201.

For another example, based on the log data, the mobile digital broadcast receiver 205 may establish an inter-device network connection 206 by transmitting a signal of request for interconnection to an external Internet device 203 which showed the best network communications quality in the indirect return channel 202 to the remote data server 201.

Next, a return channel is secured by the inter-device network connection 206 in step 303.

The mobile digital broadcast receiver 205 may transmit a request for generating an indirect return channel 202 including the address of the remote data server 201 to the external Internet device 203 to enable the external Internet device 203 to establish a return channel 202 with the remote data server for use as an indirect data return channel 202 between the mobile digital broadcast receiver 205 and the remote data server 201.

The mobile digital broadcast receiver 205 and/or the external Internet device 203 may include pre-installed software application(s) which allows them to establish an inter-device network connection 206 in step 302 and to generate a return channel 202 to the remote data server 201 in step 303. The software application may be operated in a plug-and-play mode to enable automatic interconnection between devices and as well as automatic generation of indirect return channel 202 for the mobile digital broadcast receiver 205.

Next, data transmission on the indirect return channel 202 is performed between the mobile digital broadcast receiver 205 and the remote data server 201 through the external Internet device 203 in step 304.

The data being transmitted may include any kind of information that may be used in connection with the provision of broadcasting services. In a particular embodiment, the mobile digital broadcast receiver 205 may periodically transmit and receive CAS data to and from the remote CAS data server 201 via the indirect return channel 202.

Using the above-described steps 301 to 304, the mobile digital broadcast receiver 205 of the present invention may perform data transmission to the remote data server 201 for providing various services without internal Internet access capabilities.

Figure 4:
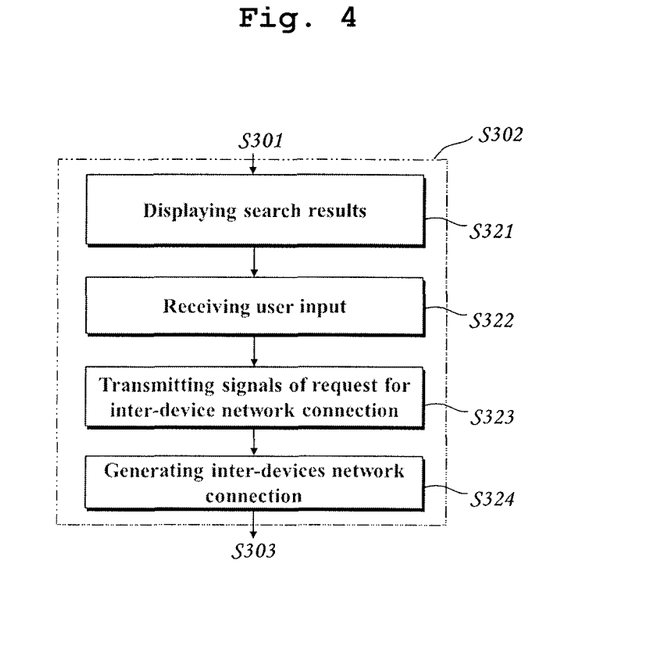
FIG. 4 illustrates a detailed flow chart for generating inter-device network connection according to an embodiment of the present invention.

FIG. 4 illustrates a flow chart showing more detailed steps of inter-device network connection 206 in step 302 in FIG. 3.

Upon completion of the searching step 301, the mobile digital broadcast receiver 205 may display the search results in step 321.

Figure 5:
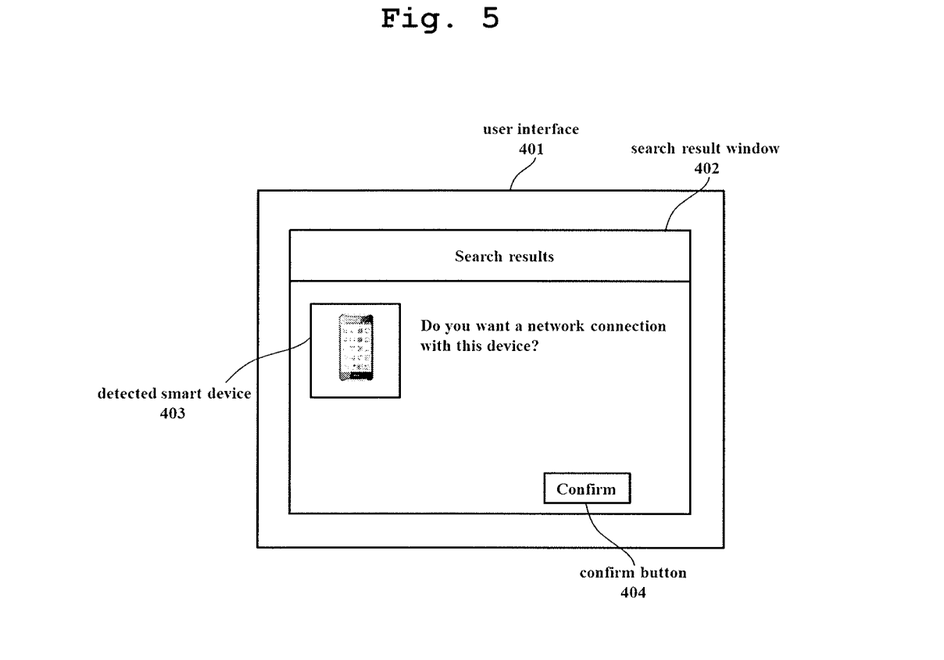
FIG. 5 illustrates a user interface having menu for confirming inter-device network connection according to an embodiment of the present invention.
Figure 6:
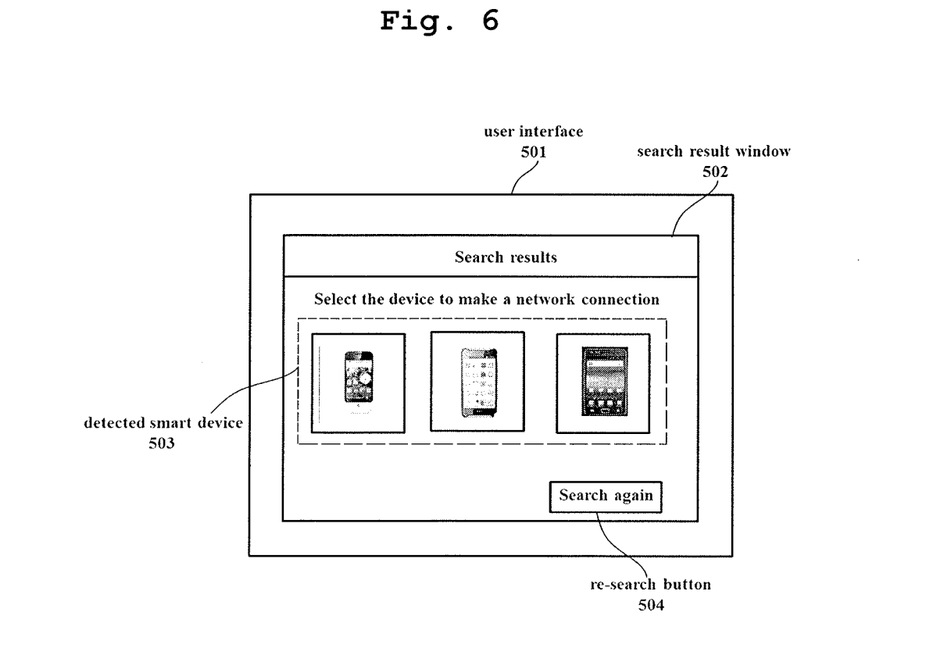
FIG. 6 illustrates a user interface having menu for selecting external Internet devices according to an embodiment of the present invention.

For example, a menu screen of FIG. 5 may be displayed when only one external Internet device 203 with internal Internet access capabilities has been found to be available for inter-device network connection 206, and a menu screen of FIG. 6 may be displayed when two or more external Internet devices 203 with respective internal Internet access capabilities have been found to be available for inter-device network connection 206. The menu screen will be further described in more detail with reference to FIGS. 5 and 6

Referring back to FIG. 4, the mobile digital broadcast receiver 205 may receive user input through its user interface in step 322.

The mobile digital broadcast receiver 205 may provide a user interface on its display module to a user and receive user input through the user interface such as in FIG. 5 or 6 on the display module.

The user may input instructions to confirm or select the target external Internet device 203 with which an inter-device network connection 206 is to be established and the mobile digital broadcast receiver 205 may receive the instructions through the user interface on the display module.

Next, the mobile digital broadcast receiver 205 may transmit a signal of request for inter-device network connection to the selected or confirmed target external Internet device 203 in step 323.

Next, in response to the signal of request for inter-device network connection, the mobile digital broadcast receiver 205 and the target external Internet device 203 may establish an inter-device network connection 206 in step 324.

FIG. 5 illustrates an exemplary user interface including confirm menu for detected external Internet device.

The mobile digital broadcast receiver 205 may provide a user interface 401 on its display module and the information on the user interface 401 may include the search result window 402 showing a detected external Internet device 203 and a message asking, for example, "Do you want a network connection with this device?" The user interface 401 may also display a "Confirm" menu button 404. A more detailed text or graphical information may be further displayed in response to a cursor movement to the iconized images 403, 404 of the user interface 401.

A user may identify the detected external Internet device 203 in the search results window 402 and input confirmation instructions via the "Confirm" menu button 404 to provide a signal of request for inter-device network connection to the detected target external Internet device 203 to establish an inter-device network connection 206. This confirmation process may reduce the possibility of failure in generating inter-device network connection 206.

For example, the user may reduce the possibility of failure by confirming an external Internet device 203 which has established the most recent inter-device network connection 206 with the mobile digital broadcast receiver 205. The user may also reduce the possibility of failure by confirming an external Internet device 203 which showed the best quality in inter-device network connection 206 in the past.

FIG. 6 illustrates an exemplary user interface including a target device selection menu.

For example, as in FIG. 6, the user interface 501 may display search results window 502 including a device selecting menu 502 showing information about two or more external Internet devices 203 that have been detected to be available for inter-device network connection 206 through the search process. The search results window 502 may also include the iconized images for selecting the detected external Internet devices 203 and a re-search button 504 for restarting the search process.

A more detailed text or graphical information may be further displayed in response to a cursor movement to the iconized images 503, 504 of the search results window 502.

Figure 7:
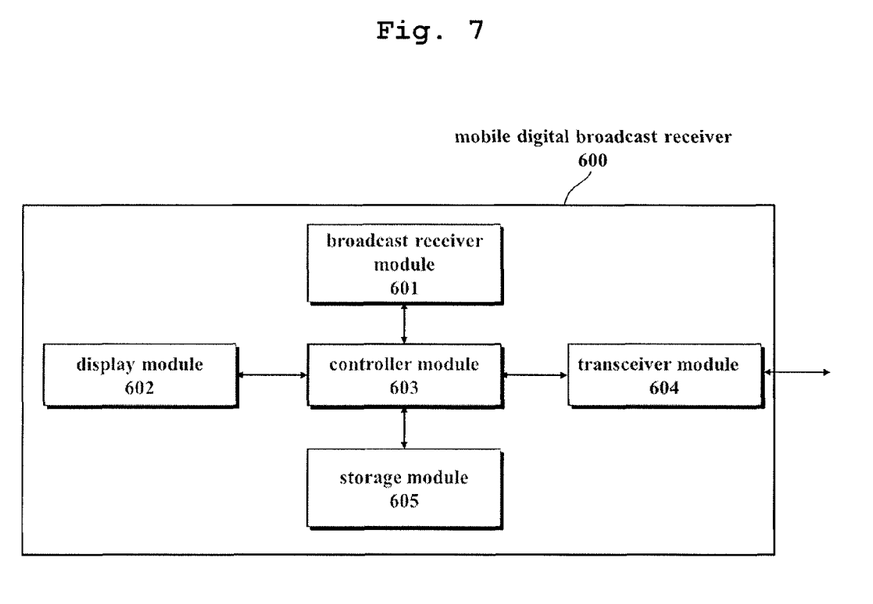
FIG. 7 illustrates a block diagram of a mobile digital broadcast receiver without Internet access capabilities according to an embodiment of the present invention.

FIG. 7 illustrates a block diagram of a mobile digital broadcast receiver 600 in accordance with an embodiment of the present invention.

The mobile digital broadcast receiver 600 may indirectly connect to and transmit data to a remote data server 201 such as CAS server through an external Internet device 203 using an indirect return channel 202. The external Internet device 203 may include any kind of Internet-connectable devices using 3G and/or WiFi data communications.

The mobile digital broadcast receiver 600 may include a broadcast receiver module 601, a display module 602, a controller module 603, a transceiver module 604 and a storage module 605.

The broadcast receiver module 601 may receive broadcasting signal from available broadcasting service providers including, but not limited to, terrestrial broadcasting, satellite broadcasting, cable broadcasting and Internet broadcasting providers. The broadcast receiver module 601 may tune to signals of particular frequency among a number of signals from antenna, satellite receiver or cable.

The broadcast receiver module 601 may include dedicated tuners for each of the terrestrial, satellite and cable broadcasting services or include an integrated tuner for all these broadcasting services. The broadcast receiver module 601 may include digital tuner, analog tuner or digital/analog integrated tuner. Further, the broadcast receiver module 601 may be tuned to user-selected broadcasting signal or user-selected broadcast contents received by antenna and transmit the broadcasting signal to the display module 602 via the controller module 603.

The display module 602 may display broadcast contents based on the broadcasting signal received from the broadcast receiver module 601 and a user interface for showing, for example, guidance messages related to the control of the mobile digital broadcast receiver 600.

The transceiver module 604 may generate inter-device network connection to secure an indirect return channel 202 to a remote data server 201 through an external Internet device 203. The indirect return channel 202 provides a data communications channel between the mobile digital broadcast receiver 600 and the remote data server 201 via the external Internet device 203.

The remote data server 201 may be provided by a digital broadcasting service provider. The return channel 202 may be selected from a group consisting of digital CATV (Cable Television) channel, DECT (Digital Enhanced Cordless Telecommunications) channel, PSTN (Public Switched Telephone Network) channel, ISDN (Integrated Services Digital Network) channel, LMDS (Local Multipoint Distribution System) channel, ATSC-M/H (Advanced Television Standards Committee Mobile/Handheld) return channel, ISDB-T (Integrated Services Digital Broadcasting-Terrestrial) return channel, and MATV (Master-Antenna Television) channel.

The transceiver module 604 may search external Internet devices with internal Internet access capabilities within a predetermined distance from the mobile digital broadcast receiver 600 and transmit signals of a request for inter-device network connection 206 to the external Internet device(s). The transceiver module 604 may be configured as a local area network module using WiFi, Bluetooth or USB connection to make the inter-device network connection 206 with the external Internet device 203. The external Internet device 203 having internal Internet access capabilities would also have a corresponding transceiver module such as WiFi, Bluetooth and USB module for the inter-device network connection.

The transceiver module 604 may also search the external Internet device in response to an update request for CAS information. The update request may be received from the remote CAS data server 201 and/or generated according to a predetermined schedule stored in the mobile digital broadcast receiver 600.

The storage module 605 may be composed of at least one storage devices including, but not limited to, RAM, flash memory, HDD, etc. The storage module 605 may store log data regarding the inter-device network connection 206. The log data may also include log data regarding return channel generation received from the external Internet device 203. The log data stored in the storage module 605 may include information regarding device networking history, network quality, the number of times being networked, frequency of network connection, etc.

The controller module 603 may control the transceiver module 604 to secure the indirect return channel 202 through an inter-device network connection with the external Internet device 203 and transmit and receive data to and from the remote data server 201 using the secured indirect return channel 202. The data to be transmitted may be any kind of data used for provision of broadcasting services including, but not limited to, subscriber information, user login information, user profile information such as age, name, sex and height, information about viewing channel, viewing hour, viewing region, viewing frequency, EMM, ECM, CAS key, favorite TV program or contents, software application, E-commerce data, T-commerce data, accounting data, weather information, regional news, GPS location and TV commercials.

The mobile digital broadcast receiver 600 may also transmit information such as type of the mobile digital broadcast receiver 600, type of the external Internet device 203, data communications protocol and data communications interface to the remote data server 201 using the indirect return channel.

The controller module 603 may enable the transceiver module 604 to periodically receive CAS data from the CAS data server 201 through the secured indirect return channel 202 and control the broadcast receiver module 601 to decode the digital broadcasting signals 204 received from the broadcasting service providers (not shown) using the CAS data received from the CAS data server 201.

Referring back to FIG. 5, the controller module 603 may control the display module 602 to display the search results of external Internet devices 203 and receive confirmation input for generating inter-device network connection, and control the transceiver module 604 to transmit signals of a request for inter-device network connection to the confirmed external Internet device 203 to form an inter-device network connection 206.

Referring back to FIG. 6, when a multiple number of external Internet device are found to be available for inter-device network connection through the search process the controller module 603 may control the display module 602 to display the selection menu for selecting the detected external Internet devices 503 on the user interface 501 and receive selecting input for selecting target external Internet devices, and control the transceiver module 604 to transmit signals of a request for inter-device network connection to the selected external Internet device to form an inter-device network connection 206.

Still further, when a multiple number of external Internet devices are found to be available for inter-device network connection the controller module 603 may control the transceiver module 604 to transmit signals of a request for inter-device network connection to external Internet devices 203 with higher probabilities of secure connection based on the log data stored in the storage module 605.

For example, based on the log data, the controller module 603 may control the transceiver module 604 to establish an inter-device network connection 206 by transmitting a signal of request for inter-device network connection to the external Internet device 203 with which the most recent inter-device network connection 206 has been established, or the controller module 603 may control the transceiver module 604 to establish an inter-device network connection 206 by transmitting signals of a request for inter-device network connection to the external Internet device 203 which showed the best network communications quality ever.

While the invention has been shown and described with respect to the embodiments, it will be understood by those skilled in the art that various changes and modification may be made without departing from the scope of the invention as defined in the following claims.

The invention claimed is:

1. A method for securing indirect return channel for a mobile digital broadcast receiver, the method comprising:
   detecting external Internet devices having internal Internet access capabilities;
   generating an inter-device network connection by transmitting signals of a request for the inter-device network connection to one of the detected external Internet devices;
   securing the indirect return channel between the mobile digital broadcast receiver and a remote data server via the requested external Internet device; and
   transmitting and receiving data used for digital broadcasting services to and from the remote data server using the indirect return channel,
   wherein the generating the inter-device network connection further comprises:
      displaying the detected external Internet devices; and
      receiving instructions for generating the inter-device network connection to one of the detected external Internet devices.

2. The method of claim 1, wherein the transmitting and receiving data comprises:

periodically receiving Conditional Access System (CAS) data from the remote data server using the indirect return channel, the remote data server being a CAS data server.

3. The method of claim 1, wherein the transmitting and receiving data comprises:
periodically transmitting user profile information to the remote data server using the indirect return channel.

4. The method of claim 1, wherein the detecting external Internet devices comprises:
detecting the external Internet devices upon receiving an update request for Conditional Access System (CAS) information.

5. The method of claim 1, wherein the detecting external Internet devices comprises:
detecting the external Internet devices within a predetermined distance from the mobile digital broadcast receiver using a local area transceiver module.

6. The method of claim 5, wherein the local area transceiver module includes a WiFi module, a Bluetooth module, a Near Field Communication (NFC) module, a Radio Frequency Identification (RFID) module and an Universal Serial Bus (USB) module.

7. The method of claim 1, wherein the external Internet devices include external Internet devices connectable to Internet using 3G or WiFi data communications.

8. The method of claim 1, wherein a communications technology for establishing the inter-device network connection includes WiFi technology, Bluetooth technology, Near Field Communication (NFC) technology, Radio Frequency Identification (RFID) technology and Universal Serial Bus (USB) technology.

9. A method for securing indirect return channel for a mobile digital broadcast receiver, the method comprising:
detecting external Internet devices having internal Internet access capabilities;
generating an inter-device network connection by transmitting signals of a request for the inter-device network connection to one of the detected external Internet devices;
securing the indirect return channel between the mobile digital broadcast receiver and a remote data server via the requested external Internet device; and
transmitting and receiving data used for digital broadcasting services to and from the remote data server using the indirect return channel,
wherein the generating the inter-device network connection further comprises:
displaying a selection menu when a multiple number of external Internet devices are found to be available for the inter-device network connection; and
receiving instructions for generating the inter-device network connection to selected external Internet devices.

10. The method of claim 1, wherein the generating the inter-device network connection further comprises:
generating the inter-device network connection based on log data when a multiple number of external Internet devices are found to be available for the inter-device network connection.

11. The method of claim 10, wherein the generating the inter-device network connection further comprises:
generating the inter-device network connection based on the log data with the external Internet device with which the most recent inter-device network connection has been established.

12. The method of claim 10, wherein the generating the inter-device network connection further comprises:

generating the inter-device network connection based on the log data with the external Internet device having the best inter-device network communications quality.

13. The method of claim 10, wherein the generating the inter-device network connection further comprises:
generating the inter-device network based on the log data with the external Internet device having the best communications quality in the indirect return channel.

14. The method of claim 1, further comprising:
performing user profile registration, modification and cancellation through the indirect return data channel.

15. The method of claim 1, further comprising:
providing additional services in Video On Demand (VOD), e-commerce and game through the indirect return data channel.

16. The method of claim 1, wherein the indirect return channel is selected from the group consisting of digital CATV (Cable Television) channel, DECT (Digital Enhanced Cordless Telecommunications) channel, PSTN (Public Switched Telephone Network) channel, ISDN (Integrated Services Digital Network) channel, LMDS (Local Multipoint Distribution System) channel, ATSC-M/H (Advanced Television Standards Committee Mobile/Handheld) return channel, ISDB-T (Integrated Services Digital Broadcasting-Terrestrial) return channel, and MATV (Master-Antenna Television) channel.

17. A mobile digital broadcast receiver, comprising:
a broadcast receiver configured to receive digital broadcasting signals;
a display module configured to display broadcast contents in accordance with the received digital broadcasting signals;
a transceiver module configured to
search external Internet devices having internal Internet access capabilities, and
transmit signals of a request for inter-device network connection to one of the detected external Internet devices to generate an inter-device network connection; and
a controller configured to
secure an indirect return channel to a remote data server via the external Internet device using the generated inter-device network connection, and
control the transceiver module to transmit and receive data used in broadcasting services to and from the remote data server,
wherein the controller is further configured to
control the display module to display at least one of the detected external Internet devices and receive instructions for generating an inter-device network connection, and
generate the inter-device network connection by transmitting signals of a request for inter-device network connection to the at least one of the detected external Internet devices.

18. The mobile digital broadcast receiver of claim 17, wherein the controller is further configured to control the transceiver module to periodically receive Conditional Access System (CAS) data from the remote data server and controls the broadcast receiver to decode the received digital broadcasting signals using the received CAS data.

19. The mobile digital broadcast receiver of claim 17, wherein the receiver further comprises a storage and is further configured to periodically transmit user profile information stored in the storage to the remote data server using the secured indirect return channel.

20. The mobile digital broadcast receiver of claim 17, wherein the transceiver module is further configured to detect the external Internet device in response to an update request for CAS information.

21. The mobile digital broadcast receiver of claim 17, wherein the transceiver module is further configured to uses at least one communications technology selected from the group consisting of WiFi, Bluetooth Communication, Near Field Communication (NFC), Radio Frequency Identification (RFID) and Universal Serial Bus (USB).

22. The mobile digital broadcast receiver of claim 17, wherein the external Internet device is further configured to be connectable to Internet using 3G or WiFi data communications.

23. A mobile digital broadcast receiver, comprising:
a broadcast receiver configured to receive digital broadcasting signals;
a display module configured to display broadcast contents in accordance with the received digital broadcasting signals;
a transceiver module configured to
search external Internet devices having internal Internet access capabilities, and
transmit signals of a request for inter-device network connection to one of the detected external Internet devices to generate an inter-device network connection; and
a controller configured to
secure an indirect return channel to a remote data server via the external Internet device using the generated inter-device network connection, and
control the transceiver module to transmit and receive data used in broadcasting services to and from the remote data server,
wherein the controller module is further configured to
control the display module to display a selection menu for selecting one of the detected external Internet devices when a multiple number of external Internet devices are detected, and
generate the inter-device network connection by transmitting signals of a request for inter-device network connection to selected external Internet device when a selection input is received.

24. The mobile digital broadcast receiver of claim 17, wherein the receiver further comprises:
a storage configured to store log data regarding inter-device network connection, and the controller configured to generate the inter-device network connection by transmitting signals of a request for inter-device network connection to one of the detected external Internet devices based on the log data when a multiple number of external Internet devices are detected.

25. The mobile digital broadcast receiver of claim 24, wherein the controller is further configured to generate the inter-device network connection based on the log data with the external Internet device with which the most recent inter-device network connection has been established.

26. The mobile digital broadcast receiver of claim 24, wherein the controller is further configured to generate the inter-device network based on the log data with the external Internet device having the best inter-device network communications quality.

27. The mobile digital broadcast receiver of claim 17, wherein the receiver further comprises a storage configured to store log data regarding the indirect return channel, and the controller configured to generate the inter-device network connection based on the log data with the external Internet device having the best communications quality in the indirect return channel.

28. The mobile digital broadcast receiver of claim 17, wherein the indirect return channel is selected from the group consisting of digital CATV (Cable Television) channel, DECT (Digital Enhanced Cordless Telecommunications) channel, PSTN (Public Switched Telephone Network) channel, ISDN (Integrated Services Digital Network) channel, LMDS (Local Multipoint Distribution System) channel, ATSC-M/H (Advanced Television Standards Committee Mobile/Handheld) return channel, ISDB-T (Integrated Services Digital Broadcasting-Terrestrial) return channel, and MATV (Master-Antenna Television) channel.

\* \* \* \* \*